Figure 1:
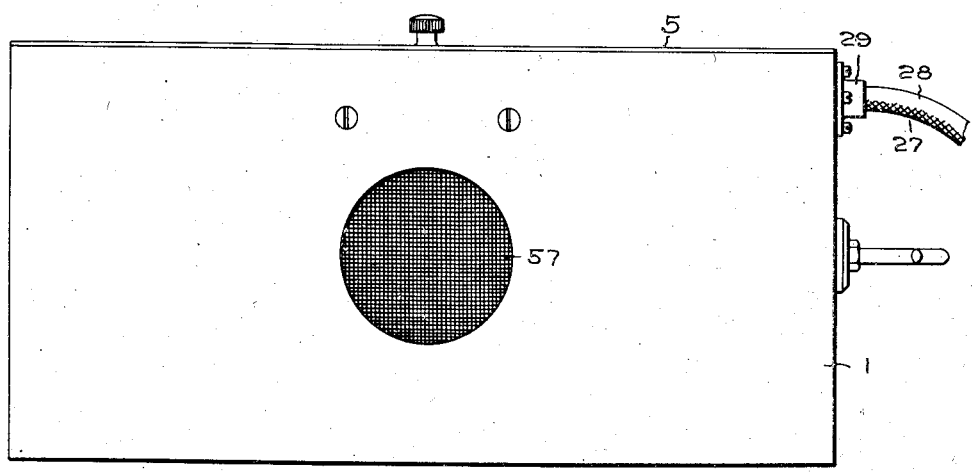

Jan. 1, 1929.

J. E. AIKEN 1,696,898

CONDENSER TRANSMITTER

Filed April 24, 1925

2 Sheets-Sheet 1

WITNESSES:
R. D. Harrison
H. D. Hineline

INVENTOR
Joseph E. Aiken
BY
Wesley G. Carr
ATTORNEY

Jan. 1, 1929.

J. E. AIKEN 1,696,898

CONDENSER TRANSMITTER

Filed April 24, 1925   2 Sheets-Sheet 2

WITNESSES:

INVENTOR
Joseph E. Aiken
BY
ATTORNEY

Patented Jan. 1, 1929.

1,696,898

UNITED STATES PATENT OFFICE.

JOSEPH E. AIKEN, OF WILKINSBURG, PENNSYLVANIA, ASSIGNOR TO WESTINGHOUSE ELECTRIC & MANUFACTURING COMPANY, A CORPORATION OF PENNSYLVANIA.

CONDENSER TRANSMITTER.

Application filed April 24, 1925. Serial No. 25,596.

My invention relates to sound-responsive means and particulary to sound-translating means for converting sound vibrations into electrical vibrations.

An object of my invention is to produce a telephone transmitter capable of uniform response over a wide range of sound frequencies.

Another object of my invention is to produce a telephone transmitter in which the capacity of a condenser is varied in response to sound vibrations and the variation in capacitance converted into electrical vibrations.

Another object of my invention is to construct a condenser transmitter and an amplifier combination which is sufficiently compact to be usable as a unitary device.

Another object of my invention is to produce a condenser transmitter containing means for avoiding the effect of electrostatic capacitance in the leads therefrom.

Another object of my invention is to produce a condenser transmitter and amplifier combination in which sound-conveying and sound-deadening means are incorporated whereby false vibrations are eliminated.

In prior utilization of sound-responsive means for the conversion of sound vibrations into electrical vibrations, it has been customary to use a device containing a diaphragm and a cooperating resistive means, the resistance of which is varied by the incidence of sound waves upon the diaphragm. Much difficulty has been experienced in obtaining a uniform response of the diaphragm and resistance unit to sound vibrations of similar amplitude but of widely different frequencies. It has been found extremely difficult to obtain equal changes of resistance for given amplitudes at low and high frequencies. This difficulty is caused largely by the natural resonance of the diaphragm and the irregularities of the available resistance materials.

My invention comprises a sound-sensitive device in which properties other than the resistance of the circuit, are made responsive to sound vibrations. I have produced a construction in which I employ a capacitance formed of a substantial stationary plate and a tightly stretched elastic diaphragm forming the other plate and positioned very closely thereto and subject to the influence of the sound to be translated. The influence of the sound varies the position of the diaphragm with respect to the stationary back plate and thereby produces a variation in the electrostatic capacitance therebetween. The variation in capacity is caused, by appropriate circuits, to influence the potential charge upon the grid of an associated triode amplifier and thereby to change the amount of current flowing in the plate circuit of the triode, thus translating sound vibration into electrical vibrations.

My invention further contains means whereby a maximum effect upon the amplifier grid is obtained for a given sound intensity incident upon the diaphragm of the transmitter, and means whereby a compact unitary device is constructed which is suitable for placement in conspicuous positions at public assemblages.

Figure 2:
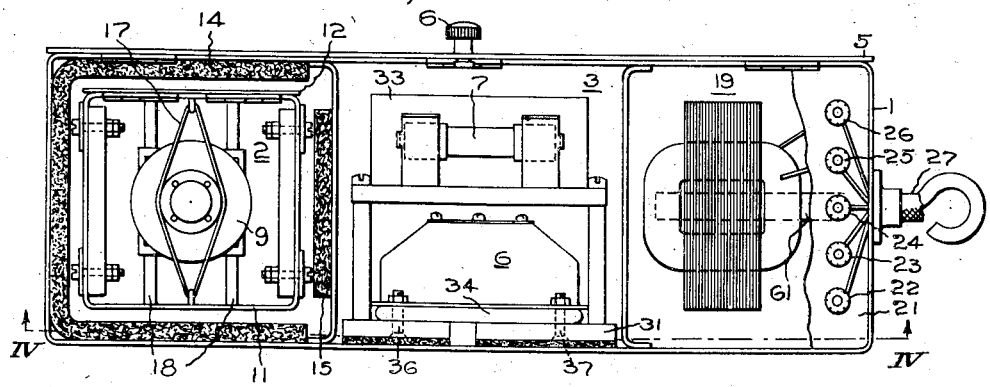
Figure 3:
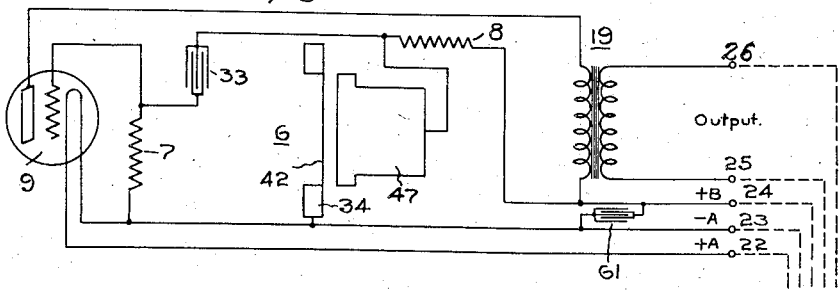
Figure 4:
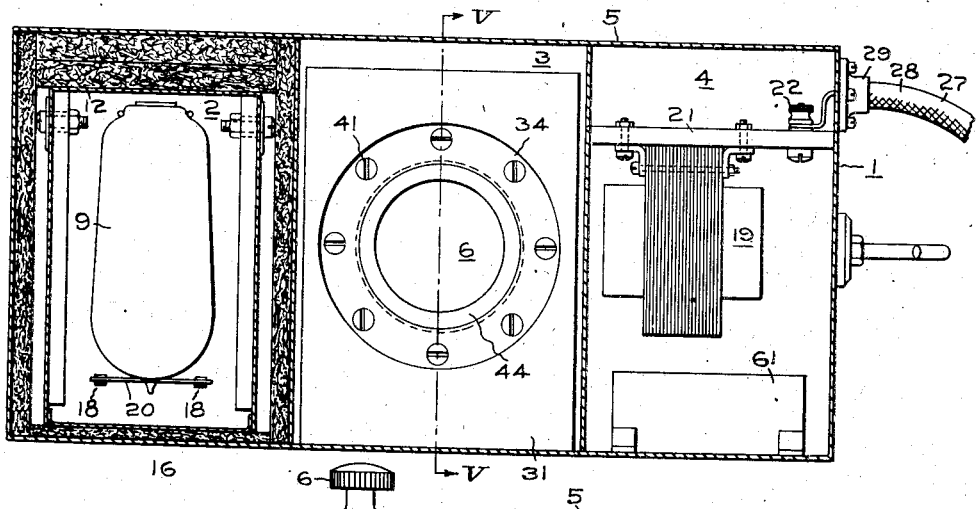
Figure 5:
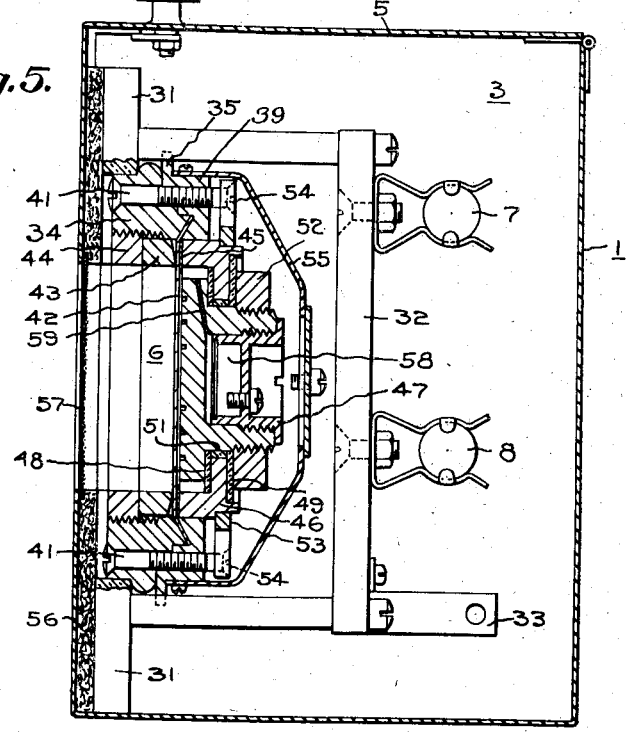

Other objects and structural details of my invention will be apparent from the following description when read in connection with the accompanying drawing, wherein:

Figure 1 is a view in front elevation of the casing of an embodiment of my invention, Fig. 2 is a plan view of the apparatus constituting my invention with the cover of the device raised to expose the contents of the interior compartments, Fig. 3 is a diagrammatic view of the apparatus and circuits of my invention, Fig. 4 is a view in vertical section along the line IV—IV of Fig. 2 of the embodiment of my invention shown in Figs. 1 and 2, and Fig. 5 is a view in vertical section on the line V—V of Figs. 2 and 4.

Referring to the drawings, my invention consists of a container 1 having compartments 2, 3 and 4. A cover 5 having a locking handle 6 permits access to the compartments 2, 3, and 4 and their contents. Compartment 3 contains the condenser transmitter 6 and resistors 7 and 8. Compartment 2 contains the amplifier triode 9 which is mounted within and supported from a sub-container 11 which has a sub-cover 12. The sub-container 11 is supported within container 1 by felt pieces 14, 15 and 16 which serve as sound-deadening means. The triode 9 is supported within the container 11 by elastic cords 17 and 18, cords 18 being threaded through a guide plate 20.

Compartment 4 contains an output transformer 19 and a terminal board 21 having binding posts 22, 23, 24, 25 and 26. A cable 27, covered with a braided metal shield 28 is provided for making connection to the various circuits within my device. The cable is passed through a collar 29 to which the wire braid shield 28 is soldered, and the lead wires are attached to the binding posts 22, 23, 24, 25 and 26. This cable is led to any suitable point at which may be installed additional amplifiers through which the circuits are connected to transfer means carrying the output currents to the point of utilization. My invention is particularly adapted as a sound translator adapted for the purpose of modulating a radio broadcasting system. It may be connected to and caused to modulate any suitable radio broadcasting system. It is not, however, limited to utilization with broad-casting apparatus but may be employed with any other apparatus which it is desired to energize by a translation of sound vibration into electrical vibrations.

The condenser transmitter portion of my invention is placed in compartment 3 of the container 1. It is better shown in the detailed vertical section in Fig. 5. It comprises a foundation plate 31 to which is attached a sub-plate 32, upon which are mounted the resistors 7 and 8 and a condenser 33. Upon the foundation plate 31 is clamped a base ring 34 by means of a ring 35 suitably held by bolts 36 and 37, shown in Fig. 2. A clamping ring 39 is attached to the base ring 34 by a plurality of screws 41 two of which are shown in Fig. 5. Between rings 34 and 39 is clamped a diaphragm 42 which may preferably be made of highly tempered steel and may preferably be gold-plated. The opening of ring 34 is screw-threaded.

A pressure ring 43 is inserted within the opening in ring 34 and brought into contact with diaphragm 42. An additional thrust ring 44, threaded similarly to the thread upon ring 34, is inserted and tightly compressed against ring 43, thereby transmitting pressure through ring 43 to the diaphragm. Pressure applied in this manner causes a stretching and tensioning of diaphragm 42 which raises its natural vibration frequency to a very high value. This value may lie above audio frequency or may lie above the range of the usual vocal sounds.

By raising the natural vibration frequency of the diaphragm in this way, the majority of the sounds to which it will be called upon to respond, are sufficiently low to be below its fundamental vibration frequency and it, therefore, shows no resonant response to them. Accordingly, it responds substantially proportionate to sounds of all frequencies below its natural period, thus causing no distortion such as is common to other types of transmitters.

A ring of mica 45 is placed in contact with the stretched diaphragm upon the opposite side from ring 43. This mica ring serves as a spacer to position a carrying ring 46. Attached to ring 46 is a back plate 47 insulated from ring 46 by mica rings 48, 49 and 51. The rear end of back plate 47 is threaded and the assembly is clamped together by a threaded nut 52 which is screwed down upon the mica rings 48, 49 and 51. The ring 46 is held in place by an auxiliary clamping ring 53 which is drawn into place by bolts 54. Protection is furnished the assembly by a cover plate 55. An auxiliary chamber 58 is formed in the back plate 47 and connection is made from it to the rear side of the diaphragm 42 by a hole 59. The foundation plate 31 is suitably clamped in place in chamber 3 and separated therefrom by a felt packing 56 through which an opening is provided. A gauze screen 57, while permitting the ingress of sound vibrations, protects the opening of container 1 against the introduction of undesirable objects.

Connection is made among the various details of my device by very short connecting leads as shown in Fig. 3. The filament of triode 9 is connected to binding posts 22 and 23. The diaphragm 42 of transmitter 6 is connected likewise to binding post 23. The grid of triode 9 is connected likewise to binding post 23. The grid of triode 9 is connected to condenser 33 and through resistance 7, which may have a value of about 5 to 20 megohms, to the filament circuit of triode 9 and binding post 23. The other terminal of the condenser 33 is connected to the back plate 47 of transmitter 6. The back plate 47 is further connected through a resistor 8, which may desirably have a value of 5 to 20 megohms, to the terminal 24, which, in turn, is connected to the positive terminal of a "B" battery having desirably a potential of about 200 volts.

The other terminal of the "B" battery is connected to the filament circuit of the triode 9. A condenser 61 is connected between the leads to the cathode and anode of the triode 9. This condenser by-passes the voice frequency variation of the plate current of the triode 9 from the plate lead to the filament lead, thereby removing it from the battery leads, which interpose an undesirable resistance to it. This condenser 61 also serves to minimize the effects of variations in the battery voltage. The anode of triode 9 is connected through the primary coil of transformer 19 to terminal 24. The secondary of transformer 19 is connected to terminals 25 and 26 which, in turn, may be connected to other amplifying means.

The transformer 19 has desirably a considerable step-down ratio whereby the output voice frequency currents are delivered at a relatively low voltage and high amperage in order that the ratio of voice current to any currents that may be induced in the leads bp adjacent power lines, may be as large as possible, and thus the troublesome effects of such induction minimized. There is required, of course, a correspondingly large step-up transformer as input means to the next amplifier stage. The supply connections, and output connections to other amplifier apparatus may be made through wires contained in cable 27 and protected by the braided covering 28. The metal braid 28, which is connected to the metal container 1 may also be used as one of the filament current leads by which arrangement it serves as a ground connection, further reducing the effects of induction.

When completely assembled and the cover 5 of my device closed, it becomes an inconspicuous square box having a circular opening provided with a netting cover. The exterior of the box may be finished in any desired way. When suitably finished, it becomes a very inconspicuous object which may be exposed in any desired manner. In the event that a translation of the sounds of a stage performance is desired, it may be hung from a cord near the proscenium arch, for instance, where it will not attract undesirable attention.

In the operation of my device, the filament of triode 9 may be energized by the application of a suitable low-voltage current through the leads attached to binding posts 22 and 23 and the plate circuit of triode 9 may be energized by a higher voltage source connected to the previously mentained filament circuit and to binding post 24, all through leads in cable 27. An electron stream from the filament of the triode 9 then makes possible a flow of current through the tube and through the primary coil of transformer 19. Simultaneously, the plates of the transmitter are charged in opposite senses by the potential of the high voltage source, through resistor 8, which, however, is so great that the adjustment of voltage across the plates of the condenser takes place relatively slowly. The grid of cathode 9 then assumes a potential with respect to the cathode which is determined by the rate of leakage of current through the resistor 7. Upon the action of sound upon diaphragm 42, its spacing with respect to the plate 47 is varied and thereby, the capacitance between the plates is varied. The variation in capacitance causes a pulsating current to flow through condenser 33 between the grid of triode 9 and the condenser plate of transmitter 6. The flow of such a fluctuating current causes changes in potential between the grid and the cathode of triode 9, which change the electron stream therethrough and thereby change the plate current. The change in plate current induces a corresponding vibrating current in the secondary of transformer 19 which may be delivered through terminals 25 and 26, and the lead wires in cable 27 to the point of utilization thereof, which may be an additional amplifier and a radio broadcasting station.

The variation in capacitance between the plates of transmitter 6 produced by incident sound is a relatively small proportion of the total capacitance between them for any but the very loudest sounds. Also, additional capacitance is introduced by the capacitance between the connecting leads from the transmitter to the first amplifier stage. The change in voltage upon the grid of the triode 9 produced by the influence of sounds upon the transmitter is proportional to the ratio of the change in capacitance produced by the sound to the total capacitance (of the transmitter and leads between it and the triode) and to the applied voltage and, therefore, the larger the ration of change of capacitance to total capacitance, the greater the change in the output current of the amplifier will be. For this reason, it is highly desirable that the parasitic capcitance of the led wires be made as small as possible. This is only done by making the leads as short as possible and placing them as far apart as possible. The construction of my device accomplishes both of these results and thereby secures a maximum signal current output from the amplifier for a given sound intensity incident upon the diaphragm.

The careful sound-deadening in both compartments 2 and 3 reduces the magnitude of false vibrations produced by the effects of stray sounds directly upon triode 9.

By this means I have produced a sound-sensitive translating means which is inconspicuous in appearance, which is uniformly responsive to sound waves over a wide range of frequency, and which produces a sufficiently large output of electrical vibrations to be satisfactory for radio broad-casting purposes and many other purposes.

While I have shown only one embodiment of my invention in the accompanying drawings, it is capable of various changes and modifications therefrom without departing from the spirit thereof, and it is desired, therefore, that only such limitations shall be placed thereon as are imposed by the prior art or indicated in the appended claims.

I claim as my invention:

1. A sound-responsive device comprising a container having compartments, a condenser-transmitter positioned in one of said compartments, means of ingress for sound thereto and sound-deadening means thereabout, an amplifier triode in another of said compartments, elastic supporting means therefor, and sound-deadening means thereabout and an amplifying transformer in another of said compartments.

2. A sound-responsive device comprising a pair of rings, a diaphragm therebetween, clamping means cooperating therewith, stretching means comprising a spacer ring having rounded edges, and a threaded pressure ring screwed within one of said pair of rings and affecting said diaphragm, and an insulatingly supported back piece, said diaphragm forming one element of a condenser, said back piece forming the other element, said diaphragm being adapted to be moved by sound, thereby changing the capacitance of said condenser.

3. A sound-responsive device comprising a stretched vibratory diaphragm, a stationary member having a face parallel and adjacent to said diaphragm, and supporting, positioning and insulating means cooperating therewith, said diaphragm and said member comprising an electrostatic condenser adapted to be varied in response to sound waves, and amplifying means comprising a triode space-current device, a current supply therefor and output means, the grid and cathode elements of said triode being respectively connected to said variable condenser, and a container means comprising a plural compartment metallic box and sound-introducing and sound-deadening means therein surrounding said condenser and amplifier means.

4. A sound-responsive device comprising a multi-compartment container, a condenser-transmitter disposed in one of said compartments, means of ingress for sound thereto, means for preventing vibrations of the walls of said container from affecting said transmitter, an amplifier triode resiliently supported in another of said compartments, means for preventing vibrations of the walls of said container from affecting said triode, a step-down transformer in another of said compartments, and appropriate connections extending between said transmitter, said triode, and said transformer.

5. A condenser transmitter comprising a diaphragm, means for tensioning said diaphragm, an electrode cooperating therewith, and additional means for influencing the response of said diaphragm to sound waves, said means comprising an adjustable closed chamber communicating with the space at the side of said diaphragm adjacent to which said electrode is positioned.

In testimony whereof, I have hereunto subscribed my name this 13th day of April, 1925.

JOSEPH E. AIKEN.